May 25, 1937.  B. B. GEYER  2,081,428
FREEZING TRAY
Filed March 10, 1936
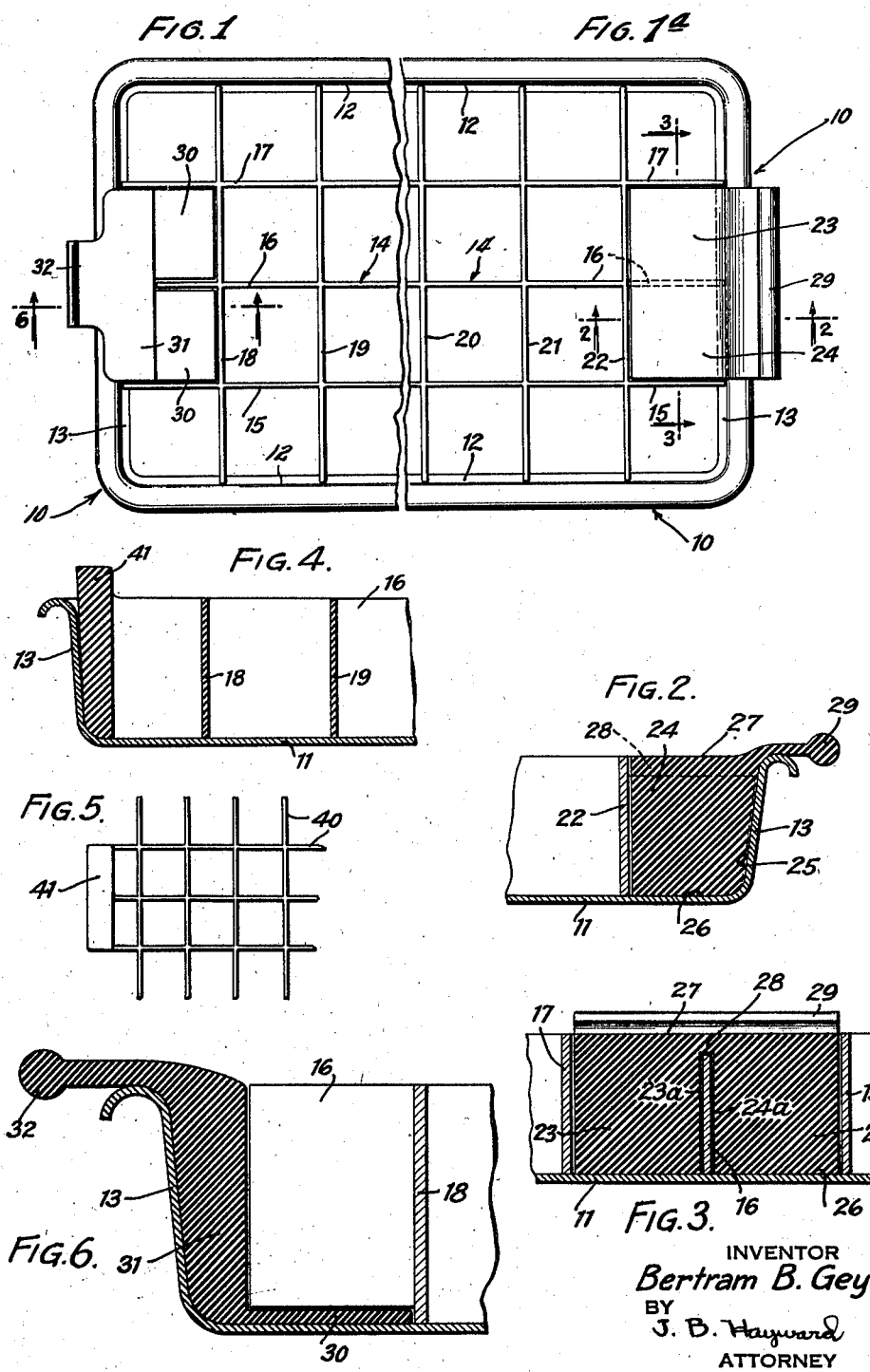
INVENTOR
Bertram B. Geyer
BY
J. B. Hayward
ATTORNEY Patented May 25, 1937

2,081,428

UNITED STATES PATENT OFFICE 2,081,428

FREEZING TRAY

Bertram B. Geyer, Greenwich, Conn.

Application March 10, 1936, Serial No. 68,001

6 Claims. (Cl. 62—108.5)

The invention relates to freezing trays, or containers of the type adapted to be inserted within the freezing compartment of a refrigerator, and more particularly to new and improved means to facilitate the removal of the frozen contents thereof.

One object of the invention resides in the provision of efficient, simple and economically manufactured means adapted to be used in conjunction with commercial types of freezing trays to facilitate and expedite removal of the frozen contents thereof.

Another object of the invention consists in the provision of means arranged to be positioned in a freezing tray in underlying relation with respect to the grid thereof, said means being adapted to be withdrawn after solidification of the contents of the tray to lift a section of said grid above the level of the top of the tray and thus facilitate complete removal of the grid together with the frozen contents of the tray.

It is a further object of the invention to provide a block of compressible material arranged to be received within a freezing tray, with one of its surfaces in engagement with the surface of a tray partition grid, said block being adapted to be readily removed from the tray after solidification of the contents thereof to facilitate the removal of the grid together with the frozen contents of the pan or to facilitate access to certain of the blocks of ice and thus expedite removal of the latter.

Another object of the invention resides in providing a rubber grid with a substantially thickened end wall of compressible character sufficient to permit manipulation of this end wall, and by its compressibility facilitate the release of the wall and thereby release from the tray the entire grid and frozen contents.

Other objects and advantages will be apparent in the following description of preferred and alternative forms of the invention. It will be understood, however, that many changes in form, construction and materials may be made by those skilled in the art without departing from the scope and spirit of the invention, as expressed in the appended claims.

Referring to the drawing:

Fig. 1 is a plan view of a freezing tray or container provided with a preferred form of the invention.

Fig. 1a is a plan view of a freezing tray or container provided with an alternative form of the invention.

Fig. 2 is a vertical sectional view taken along line 2—2 of Fig. 1a.

Fig. 3 is a vertical sectional view of the form shown in Fig. 2 and taken along line 3—3 of Fig. 1.

Figs. 4 and 5 are another form of the invention in which the rubber grid has a substantially thickened end wall of sufficient elasticity and compressibility to achieve the desired result.

Fig. 6 is another form of the invention, being a sectionalized view along the line 6—6 of Fig. 1.

In Figs. 1 and 1a, I have shown alternative forms of the invention adapted to trays or containers which may, for purposes of illustration, be substantially identical, and, for convenience, are shown in this instance as occupying opposite ends of identical trays. It will be understood that similar reference numerals refer to similar parts throughout the several views.

The numeral 10 designates in its entirety, a freezing tray having bottom 11 and side and end walls 12 and 13 respectively. The tray may be constructed of any of the materials commonly employed for that purpose but is preferably made of metal of such gauge or weight as will permit of slight twisting or flexing to break the bond formed between its side and end walls, and the respective contacting surfaces of its frozen contents.

A flexible grid, or partition 14, comprising spaced longitudinal webs 15, 16, and 17 and normally disposed intersecting webs 18 to 22 inclusive, divides the interior of the container into a plurality of spaces corresponding with the size of the individual cubicals or blocks desired when the contents of the tray are frozen. As shown in the drawing the webs of the grid terminate adjacent the end and side walls respectively of the container and are of such height that the plane defined by their upper edges is substantially coincident with the plane of the upper edges of the container walls. The grid is preferably made of rubber or thin flexible metal or other material.

Difficulty has been experienced heretofore in removing the contents of the tray after freezing occurs, partially because of the wedging action against its walls which results from the expansion inherent in the solidifying process; and partially because of the tendency of the surfaces of the tray and its contents to mutually adhere.

Furthermore, the full capacity of the tray cannot be utilized unless it be filled substantially to the top and such practice leaves so little of the grid projecting above the surface of the frozen contents of the tray that grasping the upper edge of the latter to effect its removal is impracticable. Thus recourse is commonly had to the tedious and unsatisfactory expedient of heating the exterior surface of the tray, as for example with hot water, until the frozen bond between the walls or bottom of the tray and its contents is destroyed thereby permitting emptying of the container.

In one of its aspects, the present invention consists in the provision of blocks of compressible material which are adapted to be placed in the container prior to freezing of the contents thereof, and then easily removed after solidification has occurred to provide a clear space between an end wall of the container and an adjacent side face of the grid, or of the frozen contents, and to simultaneously render a portion of the grid accessible, so that the latter may be grasped to lift both grid and frozen material from the tray without recourse to the objectionable procedure previously mentioned.

Considered from yet another viewpoint, the invention resides in the provision of compressible means adapted to lie within the container with one of its surfaces in engagement with a wall thereof and so positioned with respect to a grid that removal of the said compressible member will function to displace and consequently facilitate complete removal of the grid together with the frozen contents of the tray.

Referring to a preferred embodiment of the invention as shown in Figs. 1, 2, and 3, blocks of compressible material, such for example as rubber are indicated at 23 and 24. The external surfaces 25, of the blocks as shown in Fig. 2, are shaped to conform with the contour of an end wall 13 of tray 10, and their bottoms 26 are adapted to contact the bottom of the tray. The blocks are desirably of such height that their top surfaces 27 are flush with the plane defined by the top edge of the side and end walls of the container to preclude the possibility of their being submerged in the contents of the latter at the time of filling and their length and width are such as to completely fill the cubicals defined by webs 15, 16, 17, and 22, and the adjacent end wall of the container, thus completely excluding liquid from these spaces. To permit of simultaneous removal from the tray, the blocks are connected one to the other, in spaced, aligned relationship, by a bridge member 28, (Fig. 3) which serves to separate their adjacent vertical surfaces 23a and 24a a distance corresponding to the thickness of web 16. In the present embodiment of the invention, bridge member 28 is formed integrally with blocks 23 and 24 and the top edge of web 16 is cut away sufficiently to accommodate the former part when the blocks are resting on the bottom of the container as shown particularly in Fig. 2. It will be understood that the blocks may be connected in like relationship by other means, or two separate blocks may be used.

A tab 29, attached to, or formed integrally with the blocks and arranged to project over the wall 13, facilitates their withdrawal.

Rubber is a preferred material from which to form the blocks 23 and 24, because of its several desirable characteristics including compressibility, and elasticity, effectiveness in excluding liquid, and comparative freedom from adhesive tendencies while in contact with metal or frozen substances; but other flexible substances might be used.

In utilizing the preferred embodiment of the invention, the grid, and then the blocks, are positioned in the tray and the latter is filled with liquid to be frozen. After solidification occurs, the tray is removed from the refrigerator and twisted slightly to break the frozen bond between its contents and side walls. The tab 29 is then pulled upwardly to withdraw the blocks 23 and 24 thus leaving the bridged section of longitudinal web 16, from the end wall of the tray to cross web 22, exposed and accessible. By grasping the before-mentioned web, the grid, together with the frozen contents of tray can then be removed.

A single block may be used where desirable and it will be apparent that under such circumstances the tray would be twisted and then the block removed in the manner previously described. One or both of the longitudinal web sections defining the side walls of the cubicle vacated by the block would then be distorted sufficiently to permit engagement by the fingers whereby the grid and contents of the tray could be removed.

Another form of the invention intended to achieve a similar result of easy removal of the grid and its frozen contents, is shown in Figs. 4 and 5.

In this instance the grid is preferably made of molded rubber with the usual relatively thin intersecting longitudinal and transverse webs 40 as shown in Fig. 5, but at one end of the grid the webs are connected by a substantially thickened end wall 41, this end wall also being of rubber and preferably molded as part of the entire grid. As shown in Fig. 4 this end wall preferably rises vertically above the level of the rest of the grid so that it can be grasped by the operator.

In Fig. 5 this end wall is shown sectionalized as if cut off flush with the top level of the grid, but merely for the purpose of illustrating the character of this wall of substantially increased thickness.

According to this construction, when the contents of the tray are frozen and the tray is twisted to give the usual action of partly separating the frozen contents from the tray, as above referred to, then the operator can grasp the protruding end of the wall 41 and the elasticity and compressibility of this rubber wall permits the same to be manipulated to free this end wall from the tray and thereby facilitate the removal of the entire grid with its frozen cubes of ice from the body of the tray.

In another of its aspects the invention consists in the provision of means to elevate a section of the grid adjacent a wall of the pan, above the edge thereof, to permit gripping of the said section thus made accessible so that the entire grid and the contents of the tray may be removed. To this latter end, a strip 30 (Figs. 1 and 6), is arranged to underlie a section of the grid adjacent an end wall 13 of the tray, the strip preferably being a continuous piece extending upwardly along the wall of the pan as shown at 31 and terminating in a tab 32 which projects over the top edge of the wall, of the container as does the tab 29. As shown in the drawing, the strip 30 underlies the central web 16 of grid 14, the web being cut away sufficiently to accommodate the parts. In the present instance the strip is rectangular in contour and extends inwardly from the end wall 13 to the next adjacent cross web 18 of the partition grid 14, but will be understood that it may be of triangular or other shape and of such length as to underlie a greater or lesser extent of the grid. As shown in Fig. 6, that portion of strip 30 which lies against the end wall of the tray may be reinforced, as for example, by making it of relatively greater thickness than the part which underlies the grid.

The strip 30 is preferably made of flexible, or elastic material possessing the non-adhering properties of rubber and being sufficiently rigid to exert the necessary pressure against the overlying grid and cubicle or cubicles, to raise the latter without distorting of the strip to such an extent as to defeat its purpose. Of course many forms of rubber are characterized by physical properties of the kind required and other materials will likewise prove satisfactory.

It will be evident that the liquid contents of the tray will overlie the strip 30 and that after solidification occurs the tab 32 may be used to exert an upward force on the strip thus elevating the end section of the grid as well as the frozen cubicles overlying strip 30, above the level of the tray. The exposed cubes may then be removed to render the grid accessible thus permitting the entire remainder of the contents of the tray to be removed.

For purposes of simplicity I have shown one alternative, as well as the preferred form of the invention in conjunction with the container of Fig. 1, but it will be obvious that either form alone will suffice in practice: and that any one of the other constructions, as shown in Figs. 4, 5, and 6, may be singly employed to accomplish the objects of the invention.

In each embodiment of the invention, use has been made of a compressible, or flexible member adapted to be received in the freezing tray at the time of filling the latter; the said member being provided, or formed integrally with, a projection extending above the plane defined by the upper edges of the walls of the container to afford means of manipulating the member after solidification of the contents of the tray, thus utilizing the compressible characteristic of the member to liberate its surfaces from the frozen contents of the tray, the walls of the latter, or both; so that the member, the grid, and the contents of the tray may be easily and quickly removed.

I claim as my invention:

1. In a freezing tray adapted to be inserted within the freezing compartment of a refrigerator, the combination of a non-rigid grid arranged to divide the space within the tray into a plurality of separate compartments, and a separable block of compressible material in said tray adapted to occupy one of the compartments thus defined, said block being arranged to be withdrawn after the solidification of the contents of the tray to expedite access to the grid and the solidified contents of the tray.

2. A freezing tray adapted to be inserted within the freezing compartment of a refrigerator, comprising a pan, a grid to divide said pan into a plurality of separate compartments to cause the contents of the pan to solidify in a plurality of separate cubes, and a block in said pan shaped to occupy one of the compartments defined by said grid adjacent a wall of said pan, the removal of said block subsequent to the solidification of the contents of said pan serving to facilitate removal of said grid and the solidified contents of the pan.

3. A freezing tray for refrigerators comprising: a walled container, a removable partition grid unit within said container to divide the frozen contents thereof into a plurality of blocks, and a flexible member in said container arranged to underlie a portion of said grid adjacent a wall of said container, said member including a portion extending above the level of the walls of the container and adapted to be engaged to withdraw said member, the withdrawal of said member serving to render said grid accessible to enable the latter and the frozen contents of the container to be removed.

4. A freezing tray for refrigerators comprising: a walled container, a removable partition grid unit in said container to divide the frozen contents thereof into a plurality of blocks, and a part in said container arranged to underlie a portion of said grid adjacent a wall of said container, said part including a portion extending over said wall and adapted to be manually engaged to withdraw said underlying part, the withdrawal of said part serving to render said grid accessible to enable the latter and the frozen contents of the container to be removed.

5. A freezing tray for refrigerators comprising: a pan, a removable partition grid unit in said pan to divide the frozen contents thereof into a plurality of blocks, and a separable member in said tray with one of its surfaces in bearing engagement with a portion of the surface of said grid, so that removal of said member after solidification of the contents of the tray will render said grid accessible and thus facilitate the removal of the grid and frozen contents of the pan.

6. In a freezing tray adapted to be inserted within the freezing compartment of a refrigerator, the combination of a grid formed with intersecting partitions adapted to form a plurality of ice cube molds, and a part within said tray arranged to fit between a wall thereof and one of the grid partitions, said part including a laterally projecting tab extending externally of the tray when said part is positioned therein, said tab being adapted to be engaged after freezing of the contents of the tray to withdraw said part, thereby displacing a portion of said grid to render the same accessible for manipulation to effect removal of the latter, together with the frozen contents of the tray.

BERTRAM B. GEYER.